US010637618B2

(12) United States Patent
Xu et al.

(10) Patent No.: US 10,637,618 B2
(45) Date of Patent: Apr. 28, 2020

(54) DATA TRANSMISSION METHOD AND DEVICE

(71) Applicant: ZTE CORPORATION, Shenzhen, Guangdong (CN)

(72) Inventors: Jin Xu, Guangdong (CN); Bo Dai, Guangdong (CN); Jun Xu, Guangdong (CN); Zewei Chen, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 22 days.

(21) Appl. No.: 16/069,452

(22) PCT Filed: Feb. 7, 2017

(86) PCT No.: PCT/CN2017/073039
§ 371 (c)(1),
(2) Date: Jul. 11, 2018

(87) PCT Pub. No.: WO2017/121409
PCT Pub. Date: Jul. 20, 2017

(65) Prior Publication Data
US 2019/0020453 A1    Jan. 17, 2019

(30) Foreign Application Priority Data

Jan. 11, 2016  (CN) .......................... 2016 1 0017538

(51) Int. Cl.
*H04L 5/00* (2006.01)
*H04L 1/00* (2006.01)
(Continued)

(52) U.S. Cl.
CPC .............. *H04L 5/0044* (2013.01); *H04L 1/00* (2013.01); *H04L 1/1819* (2013.01);
(Continued)

(58) Field of Classification Search
CPC ....... H04L 1/00; H04L 1/0083; H04L 1/0084; H04L 1/009; H04L 1/08; H04L 1/1819;
(Continued)

(56) References Cited

U.S. PATENT DOCUMENTS

2005/0220131 A1* 10/2005 Ginzburg ............ H04L 12/1868
370/432
2008/0197982 A1*  8/2008 Sadr .................. H03M 13/2957
340/10.4

(Continued)

FOREIGN PATENT DOCUMENTS

CN         101119182 A        2/2008
CN         101183875 A        5/2008

OTHER PUBLICATIONS

International Search Report for International Application No. PCT/CN2017/073039; Date of Completion: Apr. 13, 2017; dated Apr. 26, 2017; 4 Pages.

*Primary Examiner* — Khoa Huynh
(74) *Attorney, Agent, or Firm* — Cantor Colburn LLP (57) ABSTRACT

A data transmission method includes: selecting a t least a portion of bits from a data buffer of a transport block to form a kth subsequence of the transport block, and forming N subsequences in total; wherein, 1≤k≤N; and repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer.

14 Claims, 5 Drawing Sheets

```
┌─────────────────────────────────────────────┐  ╱─S110
│ Select a portion or all of bits from a data │
│ buffer of a transport block to form a kth   │
│ subsequence of the transport block, and     │
│ form N subsequences in total                │
└─────────────────────────────────────────────┘
                      │
                      ▼
┌─────────────────────────────────────────────┐  ╱─S120
│ Repeat the N subsequences of the transport  │
│ block for T times, perform digital baseband │
│ modulation on the N subsequences, and then  │
│ transmit the N subsequences                 │
└─────────────────────────────────────────────┘
```

(51) Int. Cl.
*H04L 1/18* (2006.01)
*H04L 27/26* (2006.01)
*H04L 27/34* (2006.01)
*H04L 27/18* (2006.01)

(52) U.S. Cl.
CPC .......... *H04L 1/1874* (2013.01); *H04L 5/0007* (2013.01); *H04L 5/0082* (2013.01); *H04L 5/0091* (2013.01); *H04L 27/2602* (2013.01); *H04L 27/18* (2013.01); *H04L 27/34* (2013.01)

(58) Field of Classification Search
CPC ... H04L 1/1874; H04L 5/0007; H04L 5/0044; H04L 5/0082; H04L 5/0091; H04L 27/06; H04L 27/18; H04L 27/2602; H04L 27/34
See application file for complete search history.

(56) References Cited

U.S. PATENT DOCUMENTS

2009/0147724 A1 6/2009 Nimbalker et al.
2016/0212663 A1* 7/2016 Uemura ............ H04W 36/0083

* cited by examiner

DATA TRANSMISSION METHOD AND DEVICE

CROSS REFERENCE

This application is the 371 application of PCT Application No. PCT/CN2017/073039 filed Feb. 7, 2017, which is based upon and claims priority to Chinese Patent Applications No. 201610017538.2 filed on Jan. 11, 2016, the entire contents thereof are incorporated herein by reference.

TECHNICAL FIELD

The embodiments of the present disclosure relate to, but are not limited to the field of wireless communications, and more particularly, to a data transmission method and device.

BACKGROUND

Machine Type Communication (MTC) User Equipment (UE or Terminal), also known as Machine to Machine (M2M) user communication equipment, is the major application form of the Internet of Things. Several technologies suitable for Cellular Internet of Things (C-IOT) are disclosed in the 3rd Generation Partnership Project (3GPP) Technical Report TR45.820V200, among which a Narrow-band Long-Term Evolution (NB-LTE) technology is the most remarkable. The system bandwidth of the system is 200 kHz, which is the same as the channel bandwidth of a Global System for Mobile Communication (GSM) system, and greatly facilitates the reuse of GSM spectrum by the NB-LTE system and reduces the mutual interference between adjacent GSM channels. The NB-LTE system has the same bandwidth and downlink subcarrier spacing as that of one Physical Resource Block (PRB) of a LTE system, which are respectively 180 kHz and 15 kHz.

Figure 1:
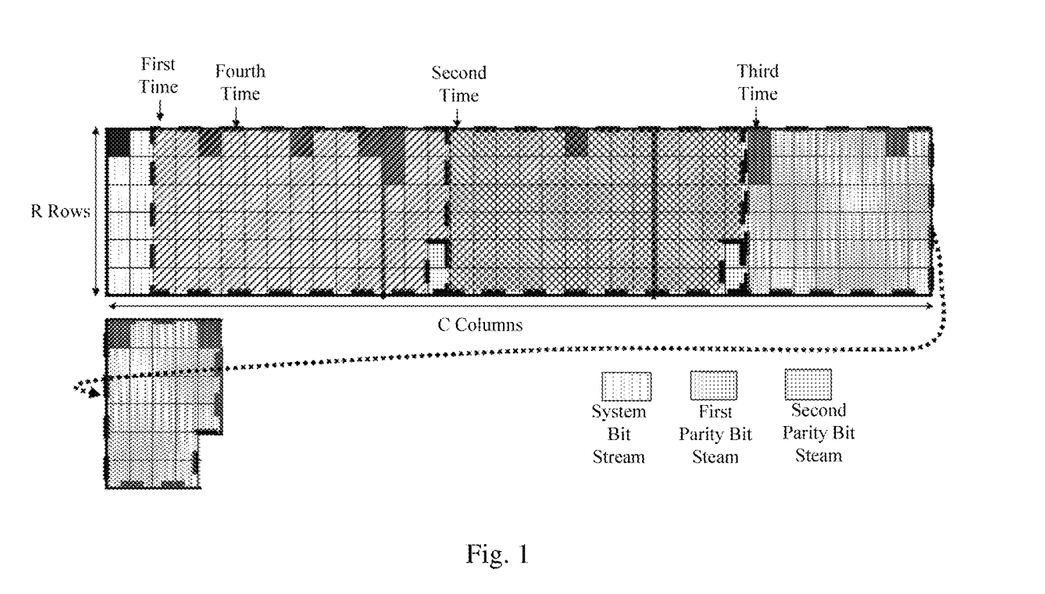
FIG. 1 is a schematic diagram of a HARQ processing procedure based on circular buffer rate matching in a 3GPP system.

As a substitution to a 3GPP Rel-6 rate matching algorithm, Rate Matching (RM) of a Circular Buffer (CB) provides a method that can easily generate a puncture pattern with excellent performances. Bits selected for transmission can be read from any point in the circular buffer. If the end of the circular buffer is reached, data can be read around the start position of the circular buffer until L bits are read completely. Different locations can be specified in the circular buffer as the start position for a Hybrid Automatic Repeat Request (HARQ) data packet to read during each transmission. The definition of a redundancy version determines multiple start positions for the HARQ data packet to read in the circular buffer. The value of the redundancy version determines the specific start position for the HARQ data packet to read in the circular buffer during this transmission. As shown in FIG. 1, in the 3GPP system, the HARQ processing procedure based on the circular buffer rate matching defines four circular Redundancy Versions (RV) (RV=0, 1, 2, 3). A long sub-packet of the L bits during each HARQ retransmission is composed of L bits clockwise selected from the start position defined by the redundancy versions.

Systems based on Orthogonal Frequency Division Multiplexing (OFDM) include an Orthogonal Frequency Division Multiple Access (OFDMA) system, a Single-carrier Frequency-Division Multiple Access (SC-FDMA) system, and the like.

Figure 2:
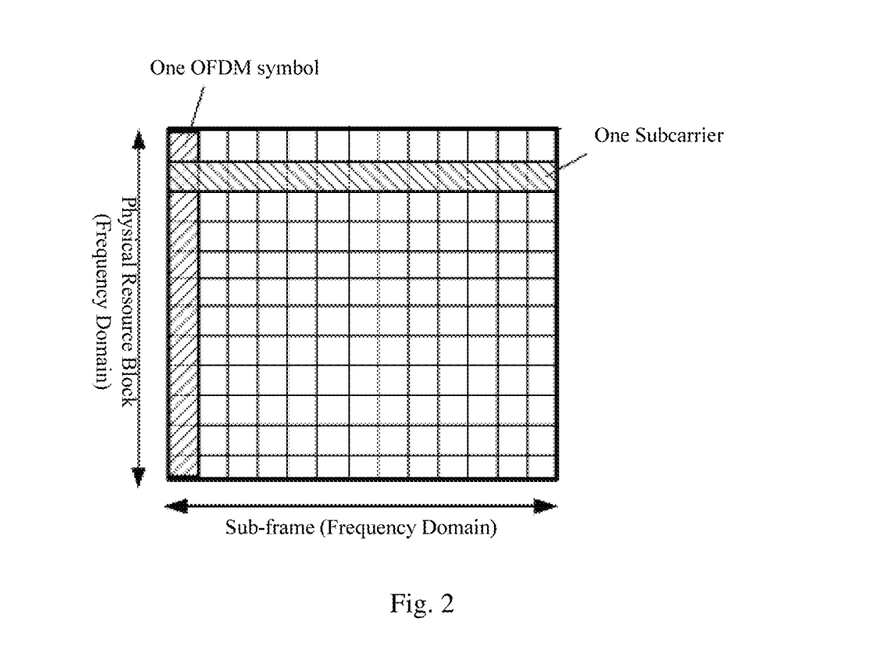
FIG. 2 is a schematic diagram of RBs in an OFDM system.

As shown in FIG. 2, in an OFDM system, one Resource Block (RB) is a time-frequency two-dimensional cell composed of multiple OFDM symbol intervals consecutive in a time aspect and multiple subcarriers consecutive in a frequency aspect, i.e., the duration of one RB is one subframe, and multiple subcarriers are included in the frequency aspect. In FIG. 2, one column refers to one OFDM symbol, and one row refers to one subcarrier.

To enhance the coverage of a narrowband IoT system, it is necessary to repeatedly transmit coded information data for multiple times, so that the received signals can be enhanced.

In current coverage enhancement technologies, an entire transport block is repeated in general. However, it has been found by the inventor of the present application in the process of studying the coverage enhancement of the narrowband IoT system that one transport block tends to continuously occupy multiple subframes in a narrowband LTE communication system because the available bandwidth in the frequency domain is smaller. If the current repeating manner is employed, the time span is too long, which is disadvantageous for fast combining and decoding at a receiving end. At the same time, since a wireless channel is a time-varying channel, the longer the time span is, the greater the change of the wireless channel is, and meanwhile, the data combining performance is also reduced.

This section provides background information related to the present disclosure which is not necessarily prior art.

SUMMARY

The following is an overview of the subject detailed herein. This summary is not intended to limit the protection scope of the claims.

The embodiments of the present disclosure provide a data transmission method and device suitable for a narrowband IoT system and capable of enhancing coverage.

A data transmission method includes:

selecting a portion or all of bits from a data buffer of a transport block to form a $k^{th}$ subsequence of the transport block, and forming N subsequences in total; wherein, $1 \leq k \leq N$; and repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer.

A data transmission device includes:

a subsequence formation module 31 configured to select a portion or all of bits from a data buffer of a transport block to form a $k^{th}$ subsequence of the transport block, and form N subsequences in total; wherein, $1 \leq k \leq N$; and a transmission module 32 configured to transmit the N subsequences after the N subsequences are repeated for T times and subjected to digital baseband modulation; wherein, T is a positive integer, a total number of repetitions of the N subsequences N*T is no less than a preset number of repetitions R, and R is a positive integer.

The embodiments of the present disclosure further provide a data transmission device, including: a processor; and a memory configured to store instructions executable by the processor; wherein the processor is configured to perform: selecting a portion or all of bits from a data buffer of a transport block to form a $k^{th}$ subsequence of the transport block, and forming N subsequences in total; wherein, $1 \leq k \leq N$; and repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer.

The embodiments of the present disclosure further provide a computer-readable storage medium storing a computer-executable instruction, wherein the computer-executable instruction is configured to achieve the above-mentioned methods.

The embodiments of the present disclosure can enhance coverage regarding the features of the narrowband IoT system and improve the data combining performances; and the optional solutions of the embodiments of the present disclosure employs different redundancy versions in repeated transmissions to produce incrementally redundant subsequences that further increase the combining gains.

Other aspects will become apparent upon reading and understanding the drawings and detailed description.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

The technical solutions of the embodiments of the present disclosure will be further described hereinafter in detail with reference to the drawings.

It should be noted that the embodiments of the present disclosure and the various features of the embodiments may be combined with each other, and are all included within the protection scope of the claims of the present application in the case of no conflicts. Moreover, although logical sequences are shown in the flow charts, in some cases, the steps shown or described may be performed in different sequences than the ones described herein.

Figure 3:
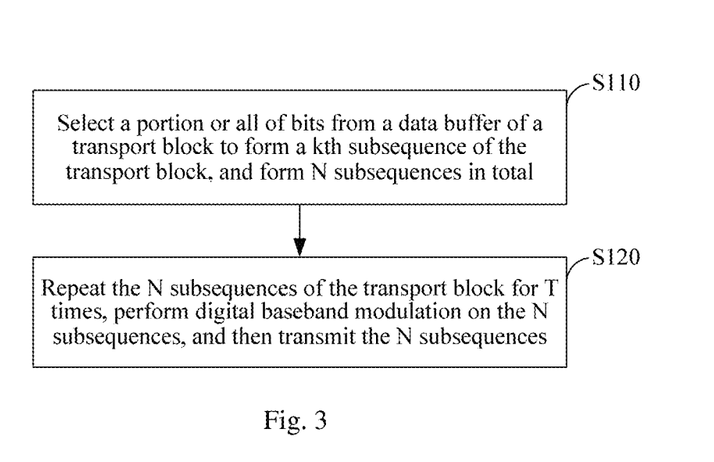
FIG. 3 is a flow diagram of a data transmission method according to a first embodiment of the present disclosure.

A first embodiment provides a data transmission method, as shown in FIG. 3, including:

S110: selecting a portion or all of bits from a data buffer of a transport block to form a $k^{th}$ subsequence of the transport block, and forming N subsequences in total; wherein, $1 \leq k \leq N$; and N represents a number of all the subsequences; and S120: repeating the N subsequences of the transport block for T times, performing digital baseband modulation on the N subsequences, and then transmitting the N subsequences; wherein, T is a positive integer, a total number of repetitions of the N subsequences (i.e., N*T) is no less than a preset number of repetitions R, and R is a positive integer.

In the embodiment, the transmitting may be, but is not limited to, transmitting to next processing unit, or transmitting to a peer device directly or after subsequent processing.

In the embodiment, the repeating for T times means that there are T subsequences in the formed transport block, which means that each subsequence will be repeatedly transmitted for T times.

In the step S120, before the transmitting, the method may further include:

mapping the N subsequences of the transport block repeated for T times and subjected to digital baseband modulation onto a physical channel resource.

It should be noted that, in the embodiment, the operation of repeating the N subsequences and the operation of performing the digital baseband modulation may be performed in any sequence, i.e., the N subsequences may be subjected to the digital baseband modulation firstly and then the N mapped subsequences are respectively repeated for T times.

In an implementation manner, the preset number of repetitions R can be explicitly or implicitly indicated from a preset value set by one or more of the following manners: being indicated by a downlink control signaling of the transport block, being indicated by a physical layer broadcast message, and being indicated by a Radio Resource Control (RRC) signaling. The direct indication refers to an explicit indication manner, such as directly informing which element in the preset set of values is taken as R; the indirect indication refers to an implicit indication manner, such as determining which element in the value set is selected as R according to a pre-agreed or default correspondence according to other data carried in a message or signaling.

The preset value set is a set of results obtained by performing a predetermined function operation on coverage level indication information.

In an implementation manner, a start position of the $k^{th}$ subsequence in the data buffer may be determined by a redundancy version $rv\_k$ of the $k^{th}$ subsequence; and the redundancy version $rv\_k$ of the $k^{th}$ subsequence is determined by any of the following manners:

one manner is that: the $rv\_k$ is obtained by circularly get element in a redundancy version sequence; for example, a redundancy version of a first subsequence is a first element in the redundancy version sequence, a redundancy version of a second subsequence is a second element in the redundancy version sequence, and so on. When a value of the redundancy version of the subsequence is a last element of the redundancy version sequence, a value of a redundancy version of next subsequence is the first element of the redundancy version sequence. Of course, the redundancy version of the first subsequence may also be a $j^{th}$ element in the redundancy version sequence, then the redundancy version of the second subsequence is a $(j+1)^{th}$ element in the redundancy version sequence, and so on. When a value of the redundancy version is the last element, getting the value is started from the first element again.

Another manner is that the rv_k is an $i^{th}$ element in the redundancy version sequence, wherein i=mod (k−1, g)+1, g is a number of elements in the redundancy version sequence, i, k and g are all positive integers, $1 \leq k \leq N$, $1 \leq i \leq g$, and mod is a modulo operator.

The redundancy version sequence includes any one of the followings: [0, 2, 3, 1], [0, 1, 2, 3], [0, 1], [0, 2], [0, 1, 2], and [0, 2, 3].

In an implementation manner, a manner of the digital baseband modulation at least includes one of the followings:

Binary Phase Shift Keying (BPSK), Quadrature Phase Shift Keying (QPSK), Octonary Phase Shift Keying (8PSK), Hexadecimal Quadrature Amplitude Modulation (16QAM), π/2 Binary Phase Shift Keying (π/2-BPSK), π/4 Quadrature Phase Shift Keying (π/4-QPSK), n/8 Octonary Phase Shift Keying (π/8-8PSK), and 8-state Binary Phase Shift Keying (8-BPSK).

In an implementation manner, the mapping the N subsequences of the transport block repeated for T times and subjected to digital baseband modulation onto a physical channel resource includes: after the N subsequences are repeated for T times and subjected to digital baseband modulation, mapping the N subsequences according to any of the following mapping manners:

single tone manner: mapping the transport block or the subsequences onto one subcarrier of a frequency domain and one or more subframes of a time domain;

multi-tone manner: mapping the transport block or the subsequences onto more subcarriers of the frequency domain and one or more subframes of the time domain; and physical resource block manner: mapping the transport block or the subsequences onto one physical resource block of the frequency domain and one or more subframes of the time domain.

In an implementation manner, a repeating manner of repeating the N subsequences of the transport block for T times includes any one or more of the followings:

first manner: respectively repeating each of the N subsequences, in units of modulation symbols, from a first modulation symbol to a last modulation symbol for T times in sequence;

second manner: respectively repeating each of the N subsequences, in units of Orthogonal Frequency Division Multiplexing (OFDM) symbols, from a first OFDM symbol to a last OFDM symbol for T times in sequence;

third manner: respectively repeating each of the N subsequences, in units of subframes, from a first subframe to a last subframe for T times in sequence;

fourth manner: respectively repeating each of the N subsequences, in units of preset physical resource cells, from a first physical resource cell to a last physical resource cell for T times in sequence; wherein, the preset physical resource cell contains physical resources of x subframes in a time aspect; x is a positive integer, and $1 \leq x \leq 12$;

fifth manner: respectively repeating each of the N subsequences for T times; and sixth manner: sequentially arranging the N subsequences in order, and repeating the N arranged subsequences for T times.

In the first manner to the fifth manner, the subsequences are repeated for T times. Specifically, in the first manner to the fourth manner, different parts of each subsequence are repeated for T times, respectively, while in the fifth manner, the subsequence as a whole is repeated for T times. In the sixth manner, N subsequences as a whole are repeated for T times. In practical applications, only one or several of the above repeating manners can be selected; The repeating manner may also include other repeating manners in addition to the above six manners, for example, each subcarrier is repeated for T times in a predetermined unit.

In an implementation manner, when the single tone manner is the mapping manner, at least one of the first manner to the fourth manner is employed as the repeating manner of the N subsequences;

when the multi-tone manner is the mapping manner, at least one of the first manner to the sixth manner is employed as the repeating manner of the N subsequences; and when the physical resource block manner is the mapping manner, at least one of the third manner to the sixth manner is employed as the repeating manner of the N subsequences.

In an embodiment, the repeating manner of the N subsequences may also be determined according to the number of available subcarriers:

when a number of available subcarriers on the physical channel resource is no more than a preset first threshold C1, the first manner is employed as the repeating manner of the N subsequences; and when the number of available subcarriers is greater than C1, at least one of the second manner, the third manner, the fourth manner, the fifth manner and the sixth manner is employed as the repeating manner of the N subsequences;

or, when the number of available subcarriers on the physical channel resource is no more than a preset second threshold C2, at least one of the first manner and the second manner is employed as the repeating manner of the N subsequences; and when the number of available subcarriers is greater than C2, at least one of the third manner, the fourth manner, the fifth manner and the sixth manner is employed as the repeating manner of the N subsequences;

or, when the number of available subcarriers on the physical channel resource is no more than a preset third threshold C3, at least one of the first manner, the second manner and the third manner is employed as the repeating manner of the N subsequences; and when the number of available subcarriers is greater than C3, at least one of the fourth manner, the fifth manner and the sixth manner is employed as the repeating manner of the N subsequences;

or, when the number of available subcarriers on the physical channel resource is no more than a preset fourth threshold C4, at least one of the first manner, the second manner, the third manner and the fourth manner is employed as the repeating manner of the N subsequences; and when the number of available subcarriers is greater than C4, at least one of the fifth manner and the sixth manner is employed as the repeating manner of the N subsequences;

or, when the number of available subcarriers on the physical channel resource is no more than a preset fifth threshold C5, at least one of the first manner, the second manner, the third manner, the fourth manner and the fifth manner is employed as the repeating manner of the N subsequences; and when the number of available subcarriers is greater than C5, the sixth manner is employed as the repeating manner of the N subsequences.

The values of the first threshold to the fifth threshold may be, but are not limited to, a relationship from small to large, i.e., the fifth threshold is the largest, the fourth threshold is the second largest, and the first threshold is the smallest.

The embodiments of the present disclosure are described below through eight specific examples.

First Example

A data transmission method of a wireless communication system provided by the example includes steps 101, 102, and 103.

In step 101, a portion or all of bits are selected from a data buffer of a transport block to form a $k^{th}$ subsequence of the transport block, wherein, $1 \leq k \leq N$, and N represents a number of all the subsequences formed.

A start position of the $k^{th}$ subsequence in the data buffer can be indicated by redundancy version information rv_k.

The start position $$SP_k = R_{TB} \cdot \left[ A \cdot \text{Operation}\left( \frac{N_{TB}}{R_{TB} \cdot N_{rv} \cdot A} \cdot \text{rv\_k} \right) + \text{offset} \right],$$

wherein $R_{TB}$ is a row number of interleavers in the data buffer of the transport block; $N_{TB}$ is the size of the data buffer of the transport block; N, represents the number of elements in the redundancy sequence, operation( ) represents a rounding operation, and an operation method includes: rounding up, rounding down, or rounding; A is a constant which is a positive integer; and offset is a column offset which is a non-negative integer.

In the example, the rv_k is obtained by circularly get element in the redundancy version sequence; for example, a redundancy version of a first subsequence is a first element in the redundancy version sequence, a redundancy version of a second subsequence is a second element in the redundancy version sequence, and so on. When a value of the redundancy version of the subsequence is a last element of the redundancy version sequence, a value of a redundancy version of next subsequence is the first element of the redundancy version sequence.

In an implementation manner, the determining method of the above redundancy version rv_k may also be determined by the following equivalent manner:

the rv_k is an $i^{th}$ element in the redundancy version sequence, wherein i=mod (k−1, g)+1, g is a number of elements in the redundancy version sequence, i, k and g are all positive integers, $1 \leq k \leq N$, $1 \leq i \leq g$, and mod is a modulo operator.

The redundancy version sequence may be one of [0, 2, 3, 1], or [0, 1, 2, 3], or [0, 1], or [0, 2], or [0, 1, 2], or [0, 2, 3].

Figure 4:
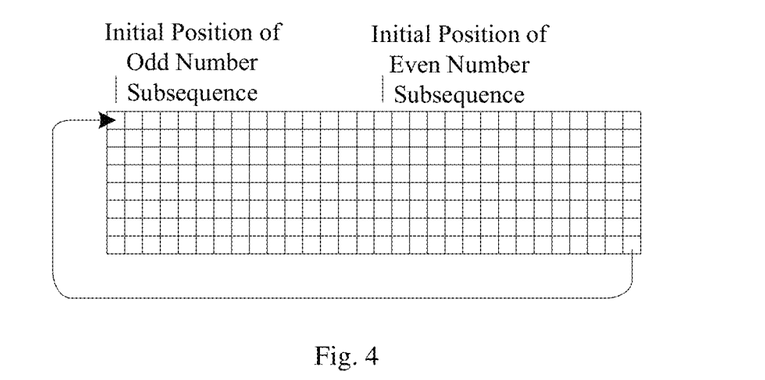
FIG. 4 is a schematic diagram of start positions of subsequences in a first example.

In the example, it is assumed that the number of all the subsequences is that N=32, and a redundancy version sequence is [0, 2], then a redundancy version of a first subsequence is 0, a redundancy version of a second subsequence is 2, a redundancy version of a third subsequence is 0, a redundancy version of a fourth subsequence is 2, . . . , and so on, a redundancy version of an odd number subsequence is 0, a redundancy version of an even number subsequence is 2, and a redundancy version of a $32^{nd}$ subsequence is 2. A corresponding start position is as shown in FIG. 4.

In step 102, the N subsequences (N=32) were repeated for T times (T=4), and digital baseband modulation is performed on the subsequences.

A total number of repetitions of the transport block is 128 times (N*T), and the N*T is no less than a preset number of repetitions R, wherein R may be indicated by Downlink Control Information (DCI), a physical layer broadcast message, or a high layer signaling in an explicit or implicit indication manner. For example, the number of repetitions R may be explicitly indicated in the DCI, the physical layer broadcast message or the high layer signaling by specialized information of one or more bits, or implicitly indicated in physical resource instruction information or code modulation instruction information of the DCI, to be which element in the preset value set of $2^n$.

The preset value set is a set of results obtained by performing a predetermined function operation on coverage level indication information. When the coverage level is a high coverage level, the maximum value R1 in the value set of R is no less than the maximum value R2 in the value set of R when the coverage level is a medium or low coverage level, i.e., R1≥R2.

In the example, it is assumed that there are two preset value sets, wherein Set_A={16, 32, 64, 128}, Set_B={2, 4, 8, 16}, the set Set_A is the value set of the number of repetitions in the case of high coverage level, and the Set_B is the value set of the number of repetitions in the case of a medium-low coverage level. In the case of high coverage level, more repetitions are needed to increase a signal receiving power; therefore, the maximum value in Set_A is greater than the maximum value in Set_B. In the example, it is assumed that the transport block is in a high coverage level scenario; therefore, the value set of the number of repetitions is the Set_A.

In the example, it is assumed that the value of the number of repetitions R is explicitly indicated by two bits in the DCI, for example, a bit "00" is used to indicate that the value of R is a first element in the Set_A, a bit "01" is used to indicate that the value of R is a second element in the Set_A, a bit "10" is used to indicate that the value of R is a third element in the Set_A, and a bit "11" is used to indicate that the value of R is a fourth element in the Set_A. In the example, it is assumed that R is a last element in the Set_A, i.e., R=128.

Similarly, R can also be explicitly indicated by two bits in the physical layer broadcast message or the high layer signaling.

In addition, R may also be implicitly indicated by a resource allocation signaling or a Modulation and Coding Scheme (MCS) in the DCI, i.e., the resource allocation signaling or the coding and modulation indication information also indicates the value of the number of repetitions R in the meanwhile.

A manner of the digital baseband modulation of the subsequences may be one of the followings: BPSK, QPSK, 8PSK, 16QAM, π/2-BPSK, π/4-QPSK, n/8-8PSK, and 8-BPSK.

In the example, it is assumed that a modulation manner is QPSK, i.e., one subsequence contains Q QPSK modulation symbols, and Q is a positive integer.

A repeating manner of repeating the N subsequences for T times is selected from one of the following six manners:

first manner: respectively repeating each of the N subsequences, in units of modulation symbols, from a first modulation symbol to a last modulation symbol for T times in sequence;

second manner: respectively repeating each of the N subsequences, in units of Orthogonal Frequency Division Multiplexing (OFDM) symbols, from a first OFDM symbol to a last OFDM symbol for T times in sequence;

third manner: respectively repeating each of the N subsequences, in units of subframes, from a first subframe to a last subframe for T times in sequence;

fourth manner: respectively repeating each of the N subsequences, in units of preset physical resource cells, from a first physical resource cell to a last physical resource cell for T times in sequence; the preset physical resource cell may contain physical resources of x subframes in a time aspect; wherein, x is a positive integer, and $1 \leq x \leq 12$;

fifth manner: respectively and directly repeating each of the N subsequences for T times; and sixth manner: sequentially arranging the N subsequences in order, and repeating the N arranged subsequences for T times.

In the example, which repeating manner is employed may be determined according to the mapping manner of the physical channel.

When a single tone manner is the mapping manner, at least one of the first manner to the fourth manner is employed as the repeating manner of the N subsequences; when a multi-tone manner is the mapping manner, at least one of the first manner to the sixth manner is employed as the repeating manner of the N subsequences; and when a physical resource block is the mapping manner, at least one of the third manner to the sixth manner is employed as the repeating manner of the N subsequences.

In the example, it is assumed that the physical channel mapping manner is the single tone manner, the first repeating manner is employed.

Figure 5:
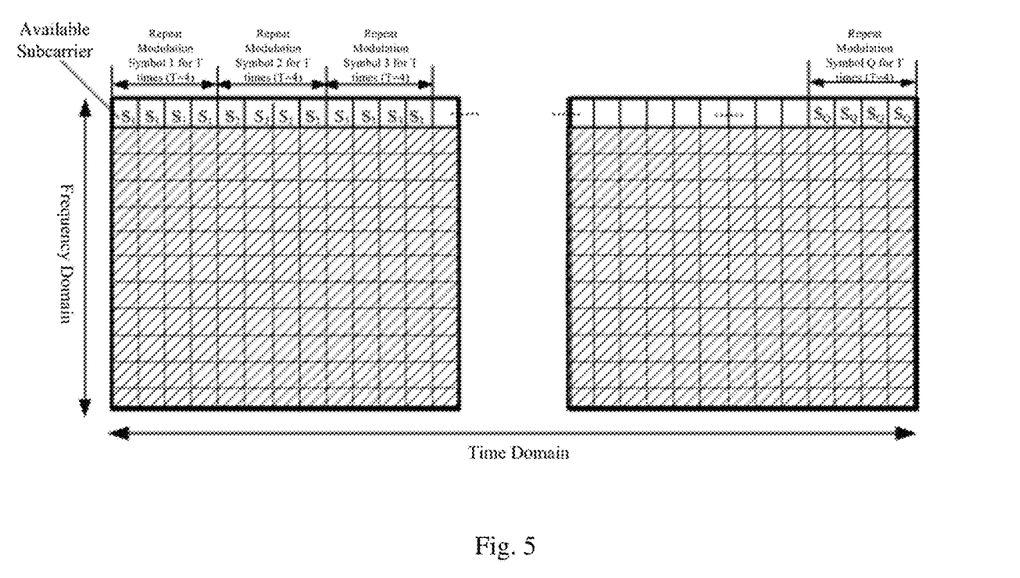
FIG. 5 is a schematic diagram of repeating subsequences for four times in the first example according to a first manner.

The $k^{th}$ subsequence may be expressed as a following modulation symbol sequence $[S_1, S_2, S_3, \ldots, S_Q]$. Each modulation symbol is sequentially repeated for T times (T=4), as shown in FIG. 5. A first modulation symbol of the $k^{th}$ subsequence is repeated for four times, and then a second modulation symbol is repeated for four times, . . . , until Q modulation symbols are all completely repeated.

Each of the N subsequences is repeated according to the manner in FIG. 5.

In step 103, the N subsequences repeated for T times and subjected to baseband modulation are mapped onto a physical channel resource.

Physical resource mapping manners include a single tone manner, a multi-tone manner, or a physical resource block manner;

single tone manner: mapping the transport block or the subsequences onto one subcarrier of a frequency domain and one or more subframes of a time domain;

multi-tone manner: mapping the transport block or the subsequences onto more subcarriers of the frequency domain and one or more subframes of the time domain; and physical resource block manner: mapping the transport block or the subsequences onto one physical resource block of the frequency domain and one or more subframes of the time domain.

In the example, it is assumed that the single tone manner is the physical channel mapping manner, i.e., the transport block occupies only one subcarrier in a frequency domain, and occupies multiple OFDM symbols in a time domain.

It should be noted that for the single tone mapping manner, one OFDM symbol can only carry one modulation symbol; therefore, in step 102, repeating in units of modulation symbols is equivalent to repeating in units of OFDM symbols.

Second Example

A data transmission method of a wireless communication system provided by the example includes steps 201, 202, 203 and 204.

In step 201, a portion or all of bits are selected from a data buffer of a transport block to form a $k^{th}$ subsequence of the transport block, wherein, $1 \leq k \leq N$, and N represents a number of all the subsequences formed.

A start position of the $k^{th}$ subsequence in the data buffer can be indicated by redundancy version information rv_k.

The start position $$SP_k = R_{TB} \cdot \left[A \cdot \text{Operation}\left(\frac{N_{TB}}{R_{TB} \cdot N_{rv} \cdot A} \cdot \text{rv\_k}\right) + \text{offset}\right],$$

wherein $R_{TB}$ is a row number of interleavers in the data buffer of the transport block; $N_{TB}$ is the size of the data buffer of the transport block; N, represents the number of elements in the redundancy sequence, operation( ) represents a rounding operation, and an operation method includes: rounding up, rounding down, or rounding; A is a constant which is a positive integer; and offset is a column offset which is a non-negative integer.

The rv_k in the formula above is obtained by circularly get element in the redundancy version sequence; for example, a redundancy version of a first subsequence is a first element in the redundancy version sequence, a redundancy version of a second subsequence is a second element in the redundancy version sequence, and so on. When a value of the redundancy version of the subsequence is a last element of the redundancy version sequence, a value of a redundancy version of next subsequence is the first element of the redundancy version sequence.

In an implementation manner, the determining method of the above redundancy version rv_k may also be determined by the following equivalent manner:

the rv_k is an $i^{th}$ element in the redundancy version sequence, wherein i=mod (k−1, g)+1, g is a number of elements in the redundancy version sequence, i, k and g are all positive integers, $1 \leq k \leq N$, $1 \leq i \leq g$, and mod is a modulo operator.

The redundancy version sequence is any one of the followings: [0, 2, 3, 1], [0, 1, 2, 3], [0, 1], [0, 2], [0, 1, 2], and [0, 2, 3].

In the example, it is assumed that the number of all the subsequences is that N=4, and a redundancy version sequence is [0, 1, 2, 3], then a redundancy version of a first subsequence is 0, a redundancy version of a second subsequence is 1, a redundancy version of a third subsequence is 2, and a redundancy version of a fourth subsequence is 3.

In step 202, digital baseband modulation is performed on the N subsequences.

A manner of the digital baseband modulation of the subsequences may be one of the followings:

BPSK, QPSK, 8PSK, 16QAM, π/2-BPSK, π/4-QPSK, n/8-8PSK, and 8-BPSK.

In the example, it is assumed that a modulation manner is QPSK.

In step 203, the N subsequences (N=4) are repeated for T times (T=4).

A total number of repetitions of the transport block is 16 times (N*T), and the N*T is no less than a preset number of repetitions R, wherein R may be indicated by DCI, a physical layer broadcast message, or a high layer signaling in an explicit or implicit indication manner. For example, the number of repetitions R may be explicitly indicated in the DCI, the physical layer broadcast message or the high layer signaling by specialized information of one or more bits, or implicitly indicated in physical resource instruction information or code modulation instruction information of the DCI, to be which element in the preset value set of $2^n$.

The preset value set is a set of results obtained by performing a predetermined function operation on coverage level indication information. When the coverage level is a high coverage level, the maximum value R1 in the value set of R is no less than the maximum value R2 in the value set of R when the coverage level is a medium or low coverage level, i.e., R1⩾R2.

In the example, it is assumed that there are two preset value sets, wherein Set_A={16, 32, 64, 128}, Set_B={2, 4, 8, 16}, the set Set_A is the value set of the number of repetitions in the case of high coverage level, and the Set_B is the value set of the number of repetitions in the case of a medium-low coverage level. In the case of high coverage level, more repetitions are needed to increase a signal receiving power; therefore, the maximum value in Set_A is greater than the maximum value in Set_B. In the example, it is assumed that the transport block is in a medium-low coverage level scenario; therefore, the value set of the number of repetitions is the Set_B.

In the example, it is assumed that the value of the number of repetitions R is explicitly indicated by two bits in the DCI, for example, a bit "00" is used to indicate that the value of R is a first element in the Set_B, a bit "01" is used to indicate that the value of R is a second element in the Set_B, a bit "10" is used to indicate that the value of R is a third element in the Set_B, and a bit "11" is used to indicate that the value of R is a fourth element in the Set_B. In the example, it is assumed that R is a last element in the Set_B, i.e., R=16.

Similarly, R can also be explicitly indicated by two bits in the physical layer broadcast message or the high layer signaling.

In addition, R may also be implicitly indicated by the resource allocation signaling or the MCS in the DCI, i.e., the resource allocation signaling or the MCS also indicates the value of the number of repetitions R in the meanwhile.

A repeating manner of repeating the N subsequences for T times is selected from one of the following six manners:

first manner: respectively repeating each of the N subsequences, in units of modulation symbols, from a first modulation symbol to a last modulation symbol for T times in sequence;

second manner: respectively repeating each of the N subsequences, in units of Orthogonal Frequency Division Multiplexing (OFDM) symbols, from a first OFDM symbol to a last OFDM symbol for T times in sequence;

third manner: respectively repeating each of the N subsequences, in units of subframes, from a first subframe to a last subframe for T times in sequence;

fourth manner: respectively repeating each of the N subsequences, in units of preset physical resource cells, from a first physical resource cell to a last physical resource cell for T times in sequence; the preset physical resource cell may contain physical resources of x subframes in a time aspect; wherein, x is a positive integer, and 1⩽x⩽12;

fifth manner: respectively and directly repeating each of the N subsequences for T times; and sixth manner: sequentially arranging the N subsequences in order, and repeating the N arranged subsequences for T times.

Which repeating manner is employed may be determined according to the mapping manner of the physical channel.

When a single tone manner is the mapping manner, at least one of the first manner to the fourth manner is employed as the repeating manner of the N subsequences; when a multi-tone manner is the mapping manner, at least one of the first manner to the sixth manner is employed as the repeating manner of the N subsequences; and when a physical resource block is the mapping manner, at least one of the third manner to the sixth manner is employed as the repeating manner of the N subsequences.

In the example, it is assumed that the physical channel mapping manner is the physical resource block manner, the third manner is employed as the repeating manner.

In the embodiment, it is assumed that the $k^{th}$ subsequence occupies a total of m subframes in the time domain, wherein m⩾1.

Figure 6:
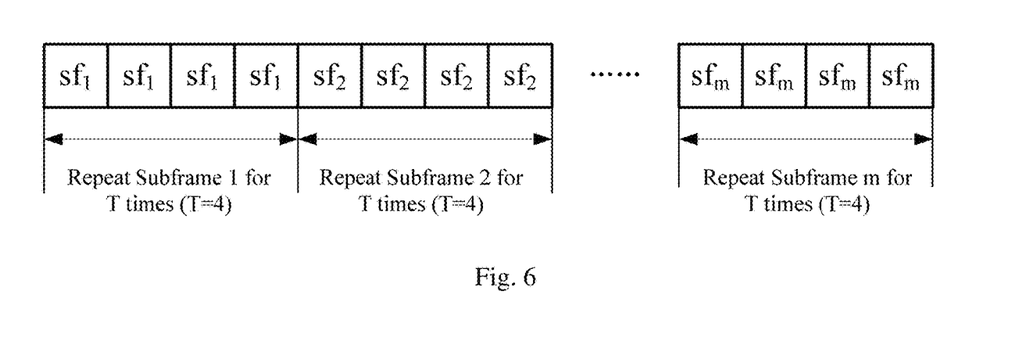
FIG. 6 is a schematic diagram of repeating subsequences for four times in a second example according to a third manner.

The $k^{th}$ subsequence may be expressed as a following subframe sequence [$sf_1$, $sf_2$, $sf_3$, . . . , $sf_m$]. Each subframe is sequentially repeated for T times (T=4), as shown in FIG. 6. A first subframe of the $k^{th}$ subsequence is repeated for four times, and then a second subframe is repeated for four times, until m subframes are all completely repeated.

Each of the N subsequences is repeated according to the manner in FIG. 6.

In step 204, the N subsequences repeated for T times and subjected to baseband modulation are mapped onto a physical channel resource.

Physical resource mapping manners include a single tone manner, a multi-tone manner, or a physical resource block manner;

single tone manner: mapping the transport block or the subsequences onto one subcarrier of a frequency domain and one or more subframes of a time domain;

multi-tone manner: mapping the transport block or the subsequences onto more subcarriers of the frequency domain and one or more subframes of the time domain; and physical resource block manner: mapping the transport block or the subsequences onto one physical resource block of the frequency domain and one or more subframes of the time domain.

In the example, it is assumed that the physical channel mapping manner is the physical resource block manner. The N baseband subsequences occupy one physical resource block in the frequency domain, and occupy one or more subframes in the time domain.

Third Example

The example differs from the first example or the second example in that: the physical channel mapping manner is the multi-tone manner in the example, i.e., the transport block occupies more subcarriers in the frequency domain, and occupy one or more subframes in the time domain.

The second manner is employed as the repeating manner.

Figure 7:
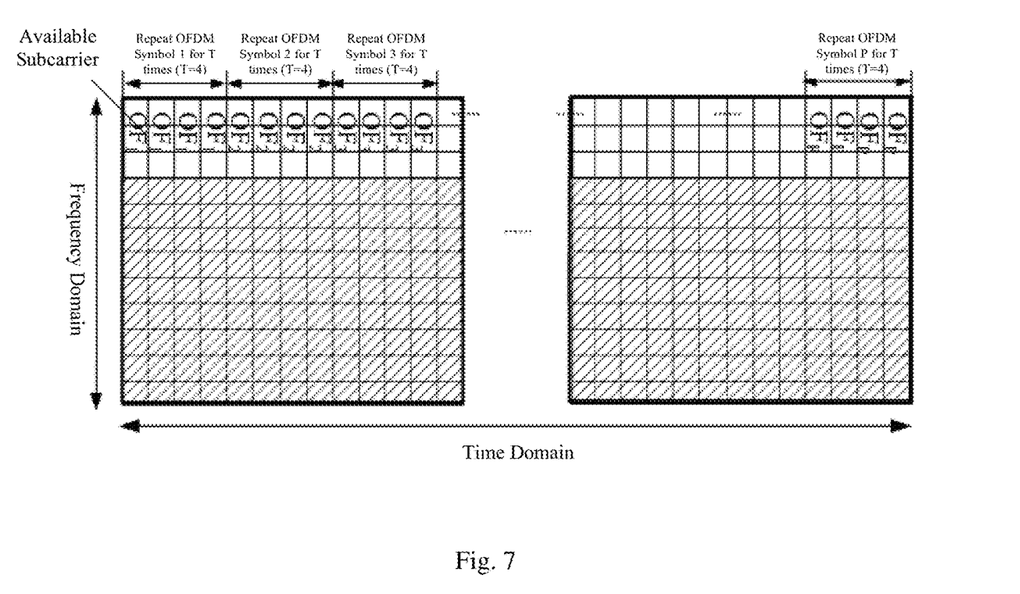
FIG. 7 is a schematic diagram of repeating subsequences for four times in a third example according to a second manner.

The $k^{th}$ subsequence may be expressed as a following OFDM symbol sequence [$OF_1$, $OF_2$, $OF_3$, $OF_P$]. Each OFDM symbol is sequentially repeated for T times (T=4), as shown in FIG. 7. A first OFDM symbol of the $k^{th}$ subsequence is repeated for four times, and then a second OFDM symbol is repeated for four times, . . . , until P OFDM symbols are all completely repeated.

Each of the N subsequences is repeated according to the manner in FIG. 7.

Fourth Example

The example differs from the first example or the third example in that: the fourth manner is employed as the repeating manner in the example.

A number of subframes of a predefined physical resource cell in the time domain is inversely proportional to a number of subcarriers in the frequency domain, and the number of subframes in the time domain is no more than 12. For example, when there is only one subcarrier in the frequency domain (performing physical channel resource mapping in a single tone manner), the predefined physical resource cell occupies 12 subframes in the time domain; and when there is only six subcarrier in the frequency domain (performing physical channel resource mapping in a multi-tone manner), the predefined physical resource cell occupies two subframes in the time domain.

Figure 8:
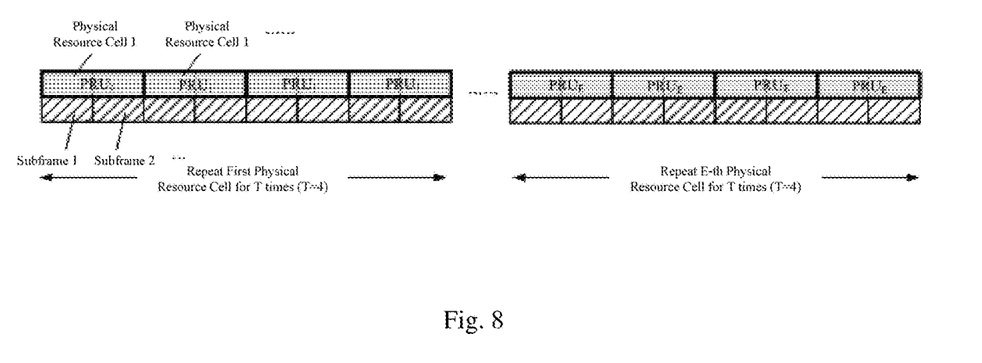
FIG. 8 is a schematic diagram of repeating subsequences for four times in a fourth example according to a fourth manner.

The $k^{th}$ subsequence may be expressed as a following physical resource cell sequence [$PRU_1$, $PRU_2$, $PRU_3$, $PRU_E$]. Each physical resource cell symbol is sequentially repeated for T times (T=4), as shown in FIG. 8. Taking six subcarriers in the frequency domain and two subframes in the time domain as an example, a first physical resource cell of the $k^{th}$ subsequence is repeated for four times, and then a second physical resource cell is repeated for four times, . . . , until E physical resource cells are all completely repeated.

Each of the N subsequences is repeated according to the manner in FIG. 8.

Fifth Example

The example differs from the first example or the third example in that: the third manner is employed as the repeating manner employed in the example, and reference can be made to the second example.

Sixth Example

The example differs from the second example or the third example in that: the fifth manner is employed as the repeating manner in the example.

Figure 9:
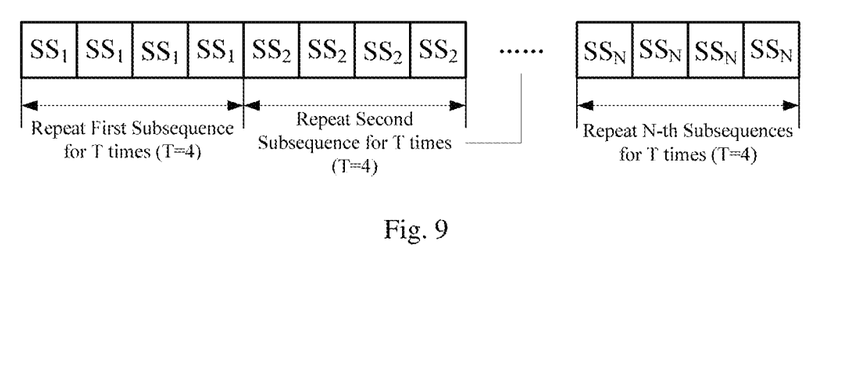
FIG. 9 is a schematic diagram of repeating subsequences for four times in a sixth example according to a fifth manner.

The transport block may be represented as a following subsequence alignment [$SS_1$, $SS_2$, $SS_3$, $SS_N$]. Each subsequence is directly repeated for T times (T=4) and then cascaded. As shown in FIG. 9, after a first subsequence is directly repeated for T times (T=4), a second subsequence is directly repeated for T times (T=4), until the N subsequences are completely repeated.

Seventh Example

The example differs from the sixth example in that: the sixth manner is employed as the repeating manner in the example.

Figure 10:
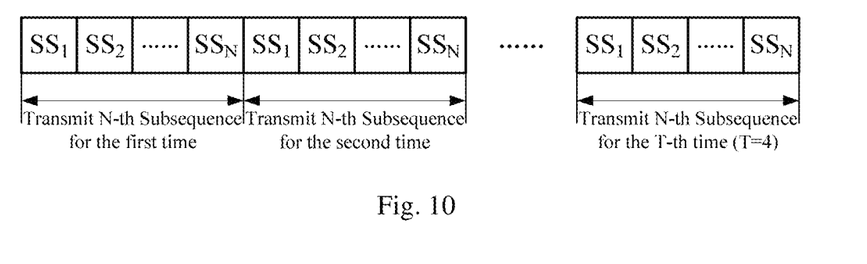
FIG. 10 is a schematic diagram of repeating subsequences for four times in a seventh example according to a sixth manner.

As shown in FIG. 10, the N subsequences are sequentially arranged in the order of subsequence numbers, and the N arranged subsequences are repeated as a whole for T times (T=4).

Eighth Example

The example differs from the first example to the seventh example in that:

the repeating manner of the N subsequences is determined according to the number of available subcarriers:

when a number of available subcarriers on the physical channel resource is no more than a preset first threshold C1, the first manner is employed as the repeating manner of the N subsequences; and when the number of available subcarriers is greater than C1, at least one of the second manner, the third manner, the fourth manner, the fifth manner and the sixth manner is employed as the repeating manner of the N subsequences;

or, when the number of available subcarriers on the physical channel resource is no more than a preset second threshold C2, at least one of the first manner and the second manner is employed as the repeating manner of the N subsequences; and when the number of available subcarriers is greater than C2, at least one of the third manner, the fourth manner, the fifth manner and the sixth manner is employed as the repeating manner of the N subsequences;

or, when the number of available subcarriers on the physical channel resource is no more than a preset third threshold C3, at least one of the first manner, the second manner and the third manner is employed as the repeating manner of the N subsequences; and when the number of available subcarriers is greater than C3, at least one of the fourth manner, the fifth manner and the sixth manner is employed as the repeating manner of the N subsequences;

or, when the number of available subcarriers on the physical channel resource is no more than a preset fourth threshold C4, at least one of the first manner, the second manner, the third manner and the fourth manner is employed as the repeating manner of the N subsequences; and when the number of available subcarriers is greater than C4, at least one of the fifth manner and the sixth manner is employed as the repeating manner of the N subsequences;

or, when the number of available subcarriers on the physical channel resource is no more than a preset fifth threshold C5, at least one of the first manner, the second manner, the third manner, the fourth manner and the fifth manner is employed as the repeating manner of the N subsequences; and when the number of available subcarriers is greater than C5, the sixth manner is employed as the repeating manner of the N subsequences.

In the example, it is assumed that C1=1, C2=2, C3=4, C4=6, and C5=8. Therefore, when the number of available subcarriers is no more than C1=1, i.e., physical channel resource mapping is performed in the single tone manner, the N subsequences are repeated by employing the first manner; when the number of available subcarriers is no more than C2=2, the N subsequences are repeated by employing the second manner; when the number of available subcarriers is no more than C3=4, the N subsequences are repeated by employing the third manner; when the number of available subcarriers is no more than C4=6, the N subsequences are repeated by employing the fourth manner; when the number of available subcarriers is no more than C5=8, the N subsequences are repeated by employing the fifth manner; and when the number of available subcarriers is more than C5=8, the N subsequences are repeated by employing the sixth manner.

Figure 11:
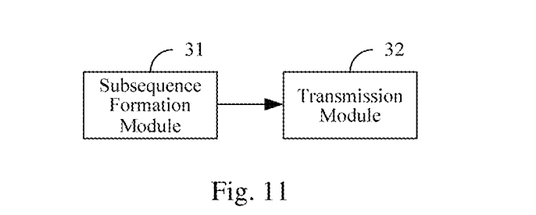
FIG. 11 is a schematic diagram of a data transmission device according to a second embodiment.

A second embodiment provides a data transmission device, as shown in FIG. 11, including:

a subsequence formation module 31 configured to select a portion or all of bits from a data buffer of a transport block to form a $k^{th}$ subsequence of the transport block, and form N subsequences in total; wherein, $1 \leq k \leq N$; and a transmission module 32 configured to transmit the N subsequences after the N subsequences are repeated for T times and subjected to digital baseband modulation; wherein, T is a positive integer, a total number of repetitions of the N subsequences N*T is no less than a preset number of repetitions R, and R is a positive integer.

The operation of repeating the subsequences and the operation of performing the digital baseband modulation by the transmission module 32 may be performed in any sequence, and any one operation may be performed before the other one.

In an implementation manner, the transmission module 32 is further configured to, before transmitting the transport block to next processing unit, map the N subsequences repeated for T times and subjected to digital baseband modulation onto a physical channel resource.

In an implementation manner, the preset number of repetitions R is explicitly or implicitly indicated from a preset value set by one or more of the following manners: being indicated by a downlink control signaling of the transport block, being indicated by a physical layer broadcast message, and being indicated by a radio resource control RRC signaling.

In an implementation manner, the preset value set is a set of results obtained by performing a predetermined function operation on coverage level indication information.

In an implementation manner, a start position of the $k^{th}$ subsequence in the data buffer of the transport block is indicated by a redundancy version $rv\_k$ of the $k^{th}$ subsequence; wherein, the redundancy version $rv\_k$ of the $k^{th}$ subsequence is obtained by circularly get element in a redundancy version sequence.

In an implementation manner, a start position of the $k^{th}$ subsequence in the data buffer of the transport block is indicated by a redundancy version $rv\_k$ of the $k^{th}$ subsequence; wherein, the redundancy version $rv\_k$ of the $k^{th}$ subsequence is an $i^{th}$ element in the redundancy version sequence, $i=\mod(k-1, g)+1$, g is a number of elements in the redundancy version sequence, i, k and g are all positive integers, $1 \leq i \leq g$, and mod is a modulo operator.

In an implementation manner, the redundancy version sequence includes any one of the followings: [0, 2, 3, 1], [0, 1, 2, 3], [0, 1], [0, 2], [0, 1, 2], and [0, 2, 3].

In an implementation manner, a manner of the digital baseband modulation at least includes one of the followings:

binary phase shift keying BPSK, quadrature phase shift keying QPSK, octonary phase shift keying 8PSK, hexadecimal quadrature amplitude modulation 16QAM, n/2 binary phase shift keying π/2-BPSK, π/4 quadrature phase shift keying π/4-QPSK, π/8 octonary phase shift keying π/8-8PSK, and 8-state binary phase shift keying 8-BPSK.

In an implementation manner, the mapping the N subsequences of the transport block repeated for T times and subjected to digital baseband modulation by the transmission module 32 onto a physical channel resource includes:

after the N subsequences are repeated for T times and subjected to digital baseband modulation, mapping, by the transmission module 32, the N subsequences according to any of the following mapping manners:

single tone manner: mapping the transport block or the subsequences onto one subcarrier of a frequency domain and one or more subframes of a time domain;

multi-tone manner: mapping the transport block or the subsequences onto more subcarriers of the frequency domain and one or more subframes of the time domain; and physical resource block manner: mapping the transport block or the subsequences onto one physical resource block of the frequency domain and one or more subframes of the time domain.

In an implementation manner, a repeating manner of repeating the N subsequences of the transport block for T times by the transmission module 32 includes any one or more of the followings:

first manner: respectively repeating each of the N subsequences, in units of modulation symbols, from a first modulation symbol to a last modulation symbol for T times in sequence;

second manner: respectively repeating each of the N subsequences, in units of orthogonal frequency division multiplexing OFDM symbols, from a first OFDM symbol to a last OFDM symbol for T times in sequence;

third manner: respectively repeating each of the N subsequences, in units of subframes, from a first subframe to a last subframe for T times in sequence;

fourth manner: respectively repeating each of the N subsequences, in units of preset physical resource cells, from a first physical resource cell to a last physical resource cell for T times in sequence;

fifth manner: respectively repeating each of the N subsequences for T times; and sixth manner: sequentially arranging the N subsequences in order, and repeating the N arranged subsequences for T times.

The preset physical resource cell contains physical resources of x subframes in a time aspect; wherein, x is a positive integer, and $1 \leq x \leq 12$.

In an implementation manner, when the single tone manner is the mapping manner, at least one of the first manner to the fourth manner is employed as the repeating manner of the N subsequences.

In an implementation manner, when the multi-tone manner is the mapping manner, at least one of the first manner to the sixth manner is employed as the repeating manner of the N subsequences.

In an implementation manner, when the physical resource block manner is the mapping manner, at least one of the third manner to the sixth manner is employed as the repeating manner of the N subsequences.

In an implementation manner, when a number of available subcarriers on the physical channel resource is no more than a preset first threshold, the first manner is employed as the repeating manner of the N subsequences; and when the number of available subcarriers is greater than the first threshold, at least one of the second manner, the third manner, the fourth manner, the fifth manner and the sixth manner is employed as the repeating manner of the N subsequences;

or, when the number of available subcarriers on the physical channel resource is no more than a preset second threshold, at least one of the first manner and the second manner is employed as the repeating manner of the N subsequences; and when the number of available subcarriers is greater than the second threshold, at least one of the third manner, the fourth manner, the fifth manner and the sixth manner is employed as the repeating manner of the N subsequences;

or, when the number of available subcarriers on the physical channel resource is no more than a preset third threshold, at least one of the first manner, the second manner and the third manner is employed as the repeating manner of the N subsequences; and when the number of available subcarriers is greater than the third threshold, at least one of the fourth manner, the fifth manner and the sixth manner is employed as the repeating manner of the N subsequences;

or, when the number of available subcarriers on the physical channel resource is no more than a preset fourth threshold, at least one of the first manner, the second manner, the third manner and the fourth manner is employed as the repeating manner of the N subsequences; and when the number of available subcarriers is greater than the fourth threshold, at least one of the fifth manner and the sixth manner is employed as the repeating manner of the N subsequences;

or, when the number of available subcarriers on the physical channel resource is no more than a preset fifth threshold, at least one of the first manner, the second manner, the third manner, the fourth manner and the fifth manner is employed as the repeating manner of the N subsequences;

and when the number of available subcarriers is greater than the fifth threshold, the sixth manner is employed as the repeating manner of the N subsequences.

For other implementation details, references can be made to the first embodiment and the above implementation examples.

Those of ordinary skills in the art will appreciate that all or some of the steps, systems, and functional modules/units of the methods disclosed above may be implemented as software, firmware, hardware, and suitable combinations thereof. In hardware implementation, the division between the functional modules/units mentioned in the above description does not necessarily correspond to the division of physical units; for example, one physical component can have multiple functions, or one function or step can be performed cooperatively by several physical components. Some or all of the components may be implemented as software executed by a processor, such as a digital signal processor or microprocessor, or implemented as hardware, or implemented as an integrated circuit, such as an application specific integrated circuit. Such software may be distributed on a computer-readable medium, which may include a computer storage medium (or non-transitory medium) and a communication medium (or transitory medium). As is well known to those of ordinary skills in the art, the term computer storage medium includes volatile and nonvolatile, removable and non-removable medium implemented in any method or art for storing information (such as computer-readable instructions, data structures, program modules or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and can include any information delivery medium.

Those of ordinary skills in the art should understand that modifications or equivalent substitutions can be made to the technical solutions of the embodiments without departing from the spirit and scope of the technical solutions of the present disclosure, and should be included in the scope of the claims.

What is claimed is:

1. A data transmission method, comprising:
    selecting at least a portion of bits from a data buffer of a transport block to form a $k^{th}$ subsequence of the transport block, and forming N subsequences in total, wherein $1 \leq k \leq N$; and
    repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer, wherein a start position of the $k^{th}$ subsequence in the data buffer of the transport block is indicated by a redundancy version $rv\_k$ of the $k^{th}$ subsequence, and wherein the redundancy version $rv\_k$ of the $k^{th}$ subsequence is obtained by circularly get element in a redundancy version sequence; or, the redundancy version $rv\_k$ of the $k^{th}$ subsequence is an $i^{th}$ element in the redundancy version sequence, $i=\mathrm{mod}(k-1, g)+1$, g is a number of elements in the redundancy version sequence, i, k and g are all positive integers, $1 \leq i \leq g$, and mod is a modulo operator.

2. The method according to claim 1, wherein before the transmitting, the method further comprises:
    mapping the N subsequences of the transport block repeated for T times and subjected to digital baseband modulation onto a physical channel resource.

3. The method according to claim 1, wherein:
    the preset number of repetitions R is explicitly or implicitly indicated from a preset value set by one or more of the following manners: being indicated by a downlink control signaling of the transport block, being indicated by a physical layer broadcast message, and being indicated by a radio resource control RRC signaling.

4. The method according to claim 3, wherein the preset value set is a set of results obtained by performing a predetermined function operation on coverage level indication information.

5. The method according to claim 1, wherein the redundancy version sequence comprises any one of the followings: [0, 2, 3, 1], [0, 1, 2, 3], [0, 1], [0, 2], [0, 1, 2], and [0, 2, 3].

6. The method according to claim 1, wherein a manner of the digital baseband modulation comprises one of the followings:
    binary phase shift keying BPSK, quadrature phase shift keying QPSK, octonary phase shift keying 8PSK, hexadecimal quadrature amplitude modulation 16QAM, $\pi/2$ binary phase shift keying $\pi/2$-BPSK, $\pi/4$ quadrature phase shift keying $\pi/4$-QPSK, $\pi/8$ octonary phase shift keying $\pi/8$-8PSK, and 8-state binary phase shift keying 8-BPSK.

7. The method according to claim 2, wherein a repeating manner of repeating the N subsequences of the transport block for T times comprises any one or more of the followings:
    first manner: respectively repeating each of the N subsequences, in units of modulation symbols, from a first modulation symbol to a last modulation symbol for T times in sequence;
    second manner: respectively repeating each of the N subsequences, in units of orthogonal frequency division multiplexing OFDM symbols, from a first OFDM symbol to a last OFDM symbol for T times in sequence;
    third manner: respectively repeating each of the N subsequences, in units of subframes, from a first subframe to a last subframe for T times in sequence;
    fourth manner: respectively repeating each of the N subsequences, in units of preset physical resource cells, from a first physical resource cell to a last physical resource cell for T times in sequence;
    fifth manner: respectively repeating each of the N subsequences for T times; and
    sixth manner: sequentially arranging the N subsequences in order, and repeating the N arranged subsequences for T times.

8. The method according to claim 7, wherein the preset physical resource cell contains physical resources of x subframes in a time aspect; wherein, x is a positive integer, and $1 \leq x \leq 12$.

9. The method according to claim 7, wherein:
    when a number of available subcarriers on the physical channel resource is no more than a preset first threshold, the first manner is employed as the repeating manner of the N subsequences; and when the number of available subcarriers is greater than the first threshold, at least one of the second manner, the third manner, the fourth manner, the fifth manner and the sixth manner is employed as the repeating manner of the N subsequences;

or, when the number of available subcarriers on the physical channel resource is no more than a preset second threshold, at least one of the first manner and the second manner is employed as the repeating manner of the N subsequences; and when the number of available subcarriers is greater than the second threshold, at least one of the third manner, the fourth manner, the fifth manner and the sixth manner is employed as the repeating manner of the N subsequences;

or, when the number of available subcarriers on the physical channel resource is no more than a preset third threshold, at least one of the first manner, the second manner and the third manner is employed as the repeating manner of the N subsequences; and when the number of available subcarriers is greater than the third threshold, at least one of the fourth manner, the fifth manner and the sixth manner is employed as the repeating manner of the N subsequences;

or, when the number of available subcarriers on the physical channel resource is no more than a preset fourth threshold, at least one of the first manner, the second manner, the third manner and the fourth manner is employed as the repeating manner of the N subsequences; and when the number of available subcarriers is greater than the fourth threshold, at least one of the fifth manner and the sixth manner is employed as the repeating manner of the N subsequences; and or, when the number of available subcarriers on the physical channel resource is no more than a preset fifth threshold, at least one of the first manner, the second manner, the third manner, the fourth manner and the fifth manner is employed as the repeating manner of the N subsequences; and when the number of available subcarriers is greater than the fifth threshold, the sixth manner is employed as the repeating manner of the N subsequences.

10. The method according to claim 2, wherein the mapping the N subsequences of the transport block repeated for T times and subjected to digital baseband modulation onto a physical channel resource comprises:

after the N subsequences are repeated for T times and subjected to digital baseband modulation, mapping the N subsequences according to any of the following mapping manners:

single tone manner: mapping the transport block or the subsequences onto one subcarrier of a frequency domain and one or more subframes of a time domain;

multi-tone manner: mapping the transport block or the subsequences onto more subcarriers of the frequency domain and one or more subframes of the time domain; and physical resource block manner: mapping the transport block or the subsequences onto one physical resource block of the frequency domain and one or more subframes of the time domain.

11. The method according to claim 10, wherein a repeating manner of repeating the N subsequences of the transport block for T times comprises any one or more of the followings:

first manner: respectively repeating each of the N subsequences, in units of modulation symbols, from a first modulation symbol to a last modulation symbol for T times in sequence;

second manner: respectively repeating each of the N subsequences, in units of orthogonal frequency division multiplexing OFDM symbols, from a first OFDM symbol to a last OFDM symbol for T times in sequence;

third manner: respectively repeating each of the N subsequences, in units of subframes, from a first subframe to a last subframe for T times in sequence;

fourth manner: respectively repeating each of the N subsequences, in units of preset physical resource cells, from a first physical resource cell to a last physical resource cell for T times in sequence;

fifth manner: respectively repeating each of the N subsequences for T times; and sixth manner: sequentially arranging the N subsequences in order, and repeating the N arranged subsequences for T times.

12. The method according to claim 11, wherein:

when the single tone manner is the mapping manner, at least one of the first manner, the second manner, the third manner and the fourth manner is employed as the repeating manner of the N subsequences;

or, when the multi-tone manner is the mapping manner, at least one of the first manner, the second manner, the third manner, the fourth manner, the fifth manner and the sixth manner is employed as the repeating manner of the N subsequences;

or, when the physical resource block manner is the mapping manner, at least one of the third manner, the fourth manner, the fifth manner and the sixth manner is employed as the repeating manner of the N subsequences.

13. A data transmission device, comprising:

a processor; and a memory configured to store instructions executable by the processor; wherein the processor is configured to perform:

selecting at least a portion of bits from a data buffer of a transport block to form a $k^{th}$ subsequence of the transport block, and forming N subsequences in total; wherein, $1 \leq k \leq N$; and repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer, wherein a start position of the $k^{th}$ subsequence in the data buffer of the transport block is indicated by a redundancy version rv_k of the $k^{th}$ subsequence, and wherein the redundancy version rv_k of the $k^{th}$ subsequence is obtained by circularly get element in a redundancy version sequence; or, the redundancy version rv_k of the $k^{th}$ subsequence is an $i^{th}$ element in the redundancy version sequence, $i=\mod(k-1, g)+1$, g is a number of elements in the redundancy version sequence, i, k and g are all positive integers, $1 \leq i \leq g$, and mod is a modulo operator.

14. A non-transitory computer-readable storage medium storing a computer-executable instruction, wherein the computer-executable instruction is executed by a computer to perform a data transmission method, the data transmission method comprising:

selecting at least a portion of bits from a data buffer of a transport block to form a $k^{th}$ subsequence of the transport block, and forming N subsequences in total; wherein, $1 \leq k \leq N$; and repeating the N subsequences of the transport block for T times, performing digital baseband modulation on the N subsequences, and then transmitting the N subsequences; wherein, T is a positive integer, a total number of repetitions of the N subsequences N*T is no less than a preset number of repetitions R, and R is a positive integer, wherein a start position of the $k^{th}$ subsequence in the data buffer of the transport block is indicated by a redundancy version rv_k of the $k^{th}$ subsequence, and wherein the redundancy version rv_k of the $k^{th}$ subsequence is obtained by circularly get element in a redundancy version sequence; or, the redundancy version rv_k of the $k^{th}$ subsequence is an $i^{th}$ element in the redundancy version sequence, i=mod (k−1, g)+1, g is a number of elements in the redundancy version sequence, i, k and g are all positive integers, $1 \leq i \leq g$, and mod is a modulo operator.

* * * * *